United States Patent [19]

Suchan

[11] Patent Number: 5,079,401
[45] Date of Patent: Jan. 7, 1992

[54] APPARATUS FOR MACHINING A HOLLOW CYLINDER TO PRODUCE A PATTERN DRUM

[75] Inventor: Erwin Suchan, Thiersee, Austria

[73] Assignee: Schablonentechnik Kufstein Gesellschaft M.B.H., Kufstein-Schaftenau, Austria

[21] Appl. No.: 610,255

[22] Filed: Nov. 7, 1990

[30] Foreign Application Priority Data

Nov. 7, 1989 [AT] Austria .................... A 2561/89

[51] Int. Cl.⁵ .................... B23K 26/00; B23K 26/16
[52] U.S. Cl. .................... 219/121.68; 219/121.84; 219/121.82
[58] Field of Search .................... 219/121.68, 121.69, 219/121.82, 121.84, 121.19, 121.20, 121.31, 121.32

[56] References Cited

U.S. PATENT DOCUMENTS

| | | | |
|---|---|---|---|
| 4,808,790 | 2/1989 | Rückl | 219/121.68 |
| 4,944,826 | 7/1990 | Zellman et al. | 156/345 |
| 4,959,275 | 9/1990 | Iguchi et al. | 428/603 |

Primary Examiner—C. L. Albritton
Attorney, Agent, or Firm—Herbert Dubno

[57] ABSTRACT

A hollow cylinder, generally a foil, for use in screen printing, is patterned by laser beam machining. The foil is held at its ends and rotated about its axis while a carriage is shiftable along a guide extending on the bed along the cylinder and carrying the laser optics for training a laser beam against the cylinder. Support rollers engage the wall of the hollow cylinder from the exterior on the carriage adjacent the laser impingement location.

15 Claims, 9 Drawing Sheets

APPARATUS FOR MACHINING A HOLLOW CYLINDER TO PRODUCE A PATTERN DRUM

FIELD OF THE INVENTION

My present invention relates to an apparatus for machining a hollow cylinder by means of a laser to produce a pattern drum, i.e. a cylindrical template for screen printing and the like.

More particularly, the invention relates to an apparatus for the removal of material from a hollow cylinder by means of a laser and wherein the apparatus comprises a support for rotatably journaling the hollow cylinder about its axis, i.e. a guide extending parallel to the hollow cylinder, a carriage displaceable on that slide and provided with laser optics for training a laser beam at a site upon the hollow cylinder at which material is to be vaporized by the laser, and a drive for the slide.

BACKGROUND OF THE INVENTION

In the production of round pattern drums or templates it is known to apply a photosensitive lacquer to a perforated foil and to expose the photosensitive lacquer through a desired mask so that, by development of the photolacquer, desired perforations of the foil are exposed to enable screen printing to be effected therethrough.

It is also known to produce a screen printing drum of the aforedescribed type to coat a perforated foil with a material which can be evaporated or destroyed by a laser beam and then to expose the perforations in the desired pattern by focusing the laser beam at which this coating material is to be removed.

In this system, the silk screen pattern blank is drawn over a circumferentially expandable support cylinder which, in the expanded state, runs perfectly round or to mount the silk screen blank over a shaft having support bodies therealong, the movement of the support bodies which are shiftable along the shaft and the laser head being coordinated with one another to ensure effective bracing at the site of the blank upon which the laser beam is trained. In devices of the latter type the positioning of the screen printing pattern blank cannot be automated.

OBJECTS OF THE INVENTION

It is, therefore, the principal object of the invention to provide an apparatus for machining a hollow cylinder to produce a pattern drum by laser ablation of a cover lacquer or the like of a perforated foil or for directly forming perforations in the foil which will permit automation of the blank mounting and overcome other drawbacks of prior art systems.

Another object of my invention is to provide an improved laser machining apparatus which does not require drawing the cylinder or drum blank over a shaft or support cylinder while nevertheless affording the requisite degree of bracing of the cylinder particularly in a region thereof at which machining by laser occurs.

SUMMARY OF THE INVENTION

These objects and others which will become apparent hereinafter are attained, in accordance with the invention by providing the apparatus with supporting cones engaging opposite ends of the hollow cylinder and one of which is shiftable along the axis of the hollow cylinder, i.e. in the axial direction thereof. Since only one of the support cones requires shifting in the direction of the blank axis, it is simple to provide for the displacement of this support cone and positioning of the pattern drum blank by automatic means.

According to a feature of the invention support rollers engage the surface of the cylinder and serve, in addition to bracing of the surrface, to clean the engraving location, i.e. the region at which the laser beam is trained upon the drum. The rearmost roll or wheel serves to remove residues and cinders of the machining process while the leading roll or wheel removes particles which might be detrimental to the machining action of the laser beam at the point of impingement of the beam upon the drum.

More particularly, an apparatus for machining a hollow cylinder to produce the pattern drum comprises:
- a support defining an axis for a hollow cylinder to be machined and receiving the hollow cylinder for rotating the hollow cylinder about the axis;
- a guide extending parallel to the axis;
- a carriage displaceable along the guide relative to the hollow cylinder;
- a drive operatively connected to the carriage for displacing same along the guide;
- a machining laser generating a beam adapted to remove material from the hollow cylinder;
- laser optics on the carriage training the beam against the hollow cylinder; and
- a plurality of roller elements bearing frictionally against an external surface of the hollow cylinder and rollingly engaging same in an axial and in a circumferential direction.

According to a feature of the invention the roller elements are mounted upon the carriage to engage the external surface of the hollow cylinder in a region thereof proximal to a machining location at which the beam impinges upon the external surface.

Advantageously, suction means are provided for applying suction to the external surface in a region of the location between two of the roller elements.

The roller elements can be rollers having axes inclined to the hollow cylinder. The rollers have concave peripheries engaging the external surface or peripheries with generatrices coinciding with generatrices of the external surface of the hollow cylinder. As noted, the roller elements can be disposed forwardly and rearwardly of the laser impingement location with respect to a direction of displacement of the carriage along the guide.

The roller elements can be mounted for oscillating movement in a direction of the axis of the hollow cylinder and/or can be swingable mounted on the carriage.

According to a feature of the invention, the suction means include a vacuum housing shiftable with respect to the laser optics in a direction of the axis of a laser beam and independently thereof. The suction means can also include a vacuum chamber and a suction air duct connected thereof with a direct inflow technique, the suction air duct engaging around a lower half of the hollow cylinder.

The roller elements can be driven by a respective motor and, where they have concave peripheries, these peripheries may conform in cross section to a segment of an ellipse or hyperbola.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
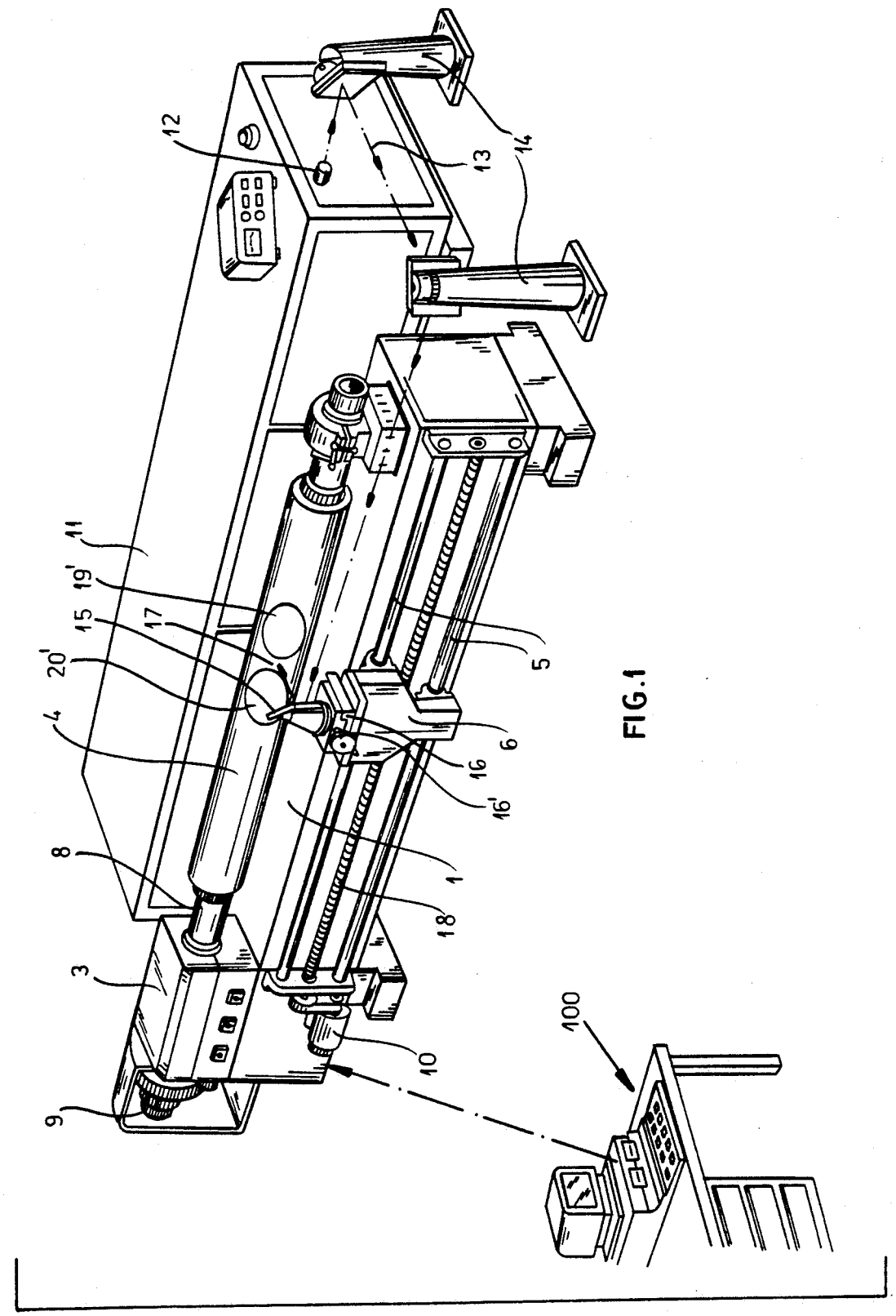
FIG. 1 is a perspective view showing the apparatus of the invention and the control station therefore.

The apparatus as shown in FIG. 1 comprises a torsion-stiff and bending-stiff bed 1 provided with a tail stock bearing 2 and a head bearing 3 for supporting a pattern cylinder 4. The latter may comprise a perforated foil coated with a material to be ablated by the laser beam or may be composed of a material to be perforated by the laser beam in the desired pattern.

Parallel guide rails 5 extend parallel to the axis of the drum or cylinder 4 and carry a carriage 6.

The head 3 contains a drive for rotating the hollow cylinder 4. A longitudinal slide drive 10 is provided, for example in the form of a stepping motor 20 whose stepping increment can be adjusted so that the advance of the longitudinal carriage 6 can be in increments of about 10 micrometers. The stepping motor 10 is connected to a lead screw 18 coupled with the longitudinal slide 6.

A laser unit 11 provides at the output side 12 of the laser, a laser beam 13 reflected at two reflector stations 14 to a mirror 15 representing the laser optics on the longitudinal slide 6. The longitudinal slide 6 carries a cross slide 16 driven by the cross feed spindle 16' to permit adjustment of the laser optics along the axis of the laser beam. The mirror 15 severs to deflect the laser beam 13 parallel to the axis of the cylinder in a direction perpendicular to the outer surface of the hollow cylinder.

The pattern to be created on the drum or hollow cylinder 4 is converted into control pulses and can be generated by sensing a master or which can be stored in memory in the electronic control system shown diagrammatically at 100 and coupled to the apparatus described. These control pulses pulse the laser beam and step the slide 6 as well as the rotation of the hollow cylinder 4, thereby removing the sheathing of the foil so as to expose the openings thereof and produce the screen printing pattern.

In this manner a point by point generation of the desired pattern on the drum can be ensured with complete programming of the laser 11, the movement of the cylinder 4 and the movement of the slide 6. Obviously repetitive pattern reproductions on the pattern drum can be achieved in a simple manner.

Figure 2:
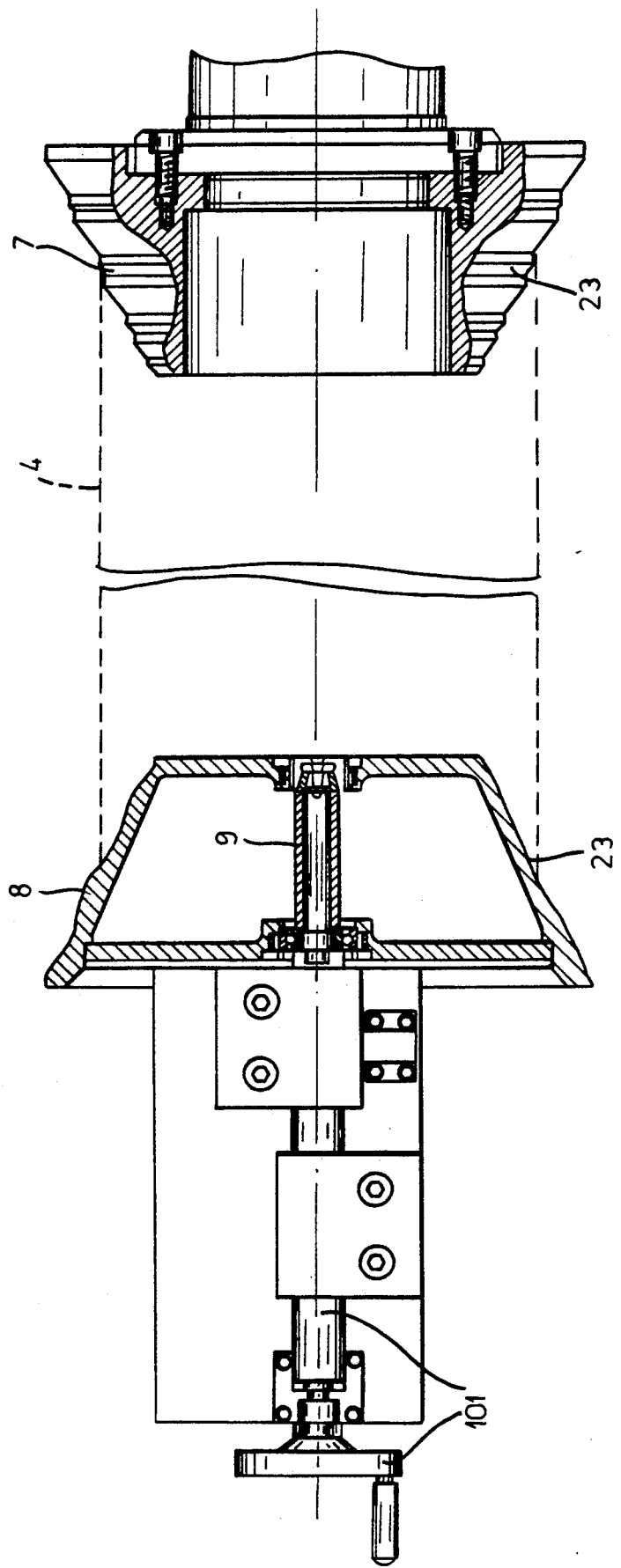
FIG. 2 is a detail cross section showing the support cones for holding the screen printing pattern blank.

As will be apparent from FIG. 2, moreover, support cones 7 and 8 are provided to engage in the ends of the hollow cylinder 4. One of the two support cones, for example the support cone 8, can be movable in the direction of the axis of the cylinder 4 manually or automatically The support cone 7 and 8 have profile surfaces which can form steps, for example the steps 23, on which a cylinder 4 of the appropriate size can be received.

The support cone 7 and 8 are each journaled for rotation about the axis of the cylinder and can be driven with the cylinder. The means 101 illustrated diagrammatically in FIG. 2 can include a hand wheel and spindle for axially displacing the support cone 8 A stub shaft 9 carrying the support cone 8 may be connected to the motor within the head stock 3.

Figure 3:
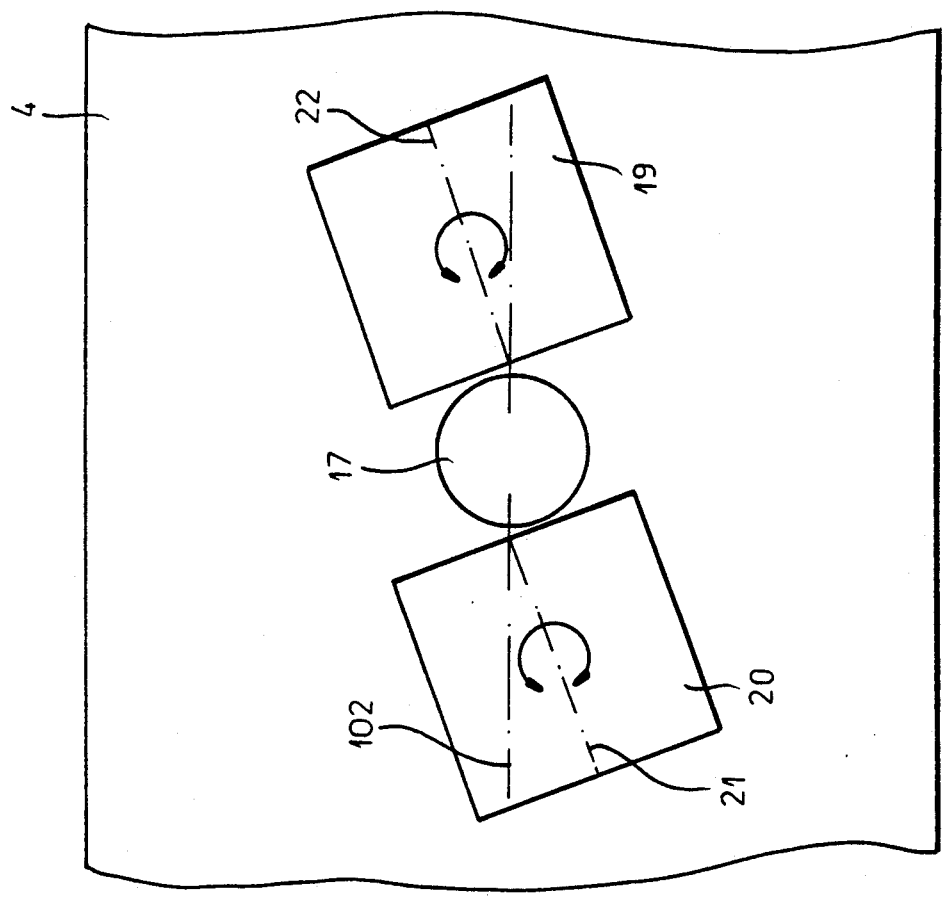
FIG. 3 is a diagrammatic plan view.
Figure 4:
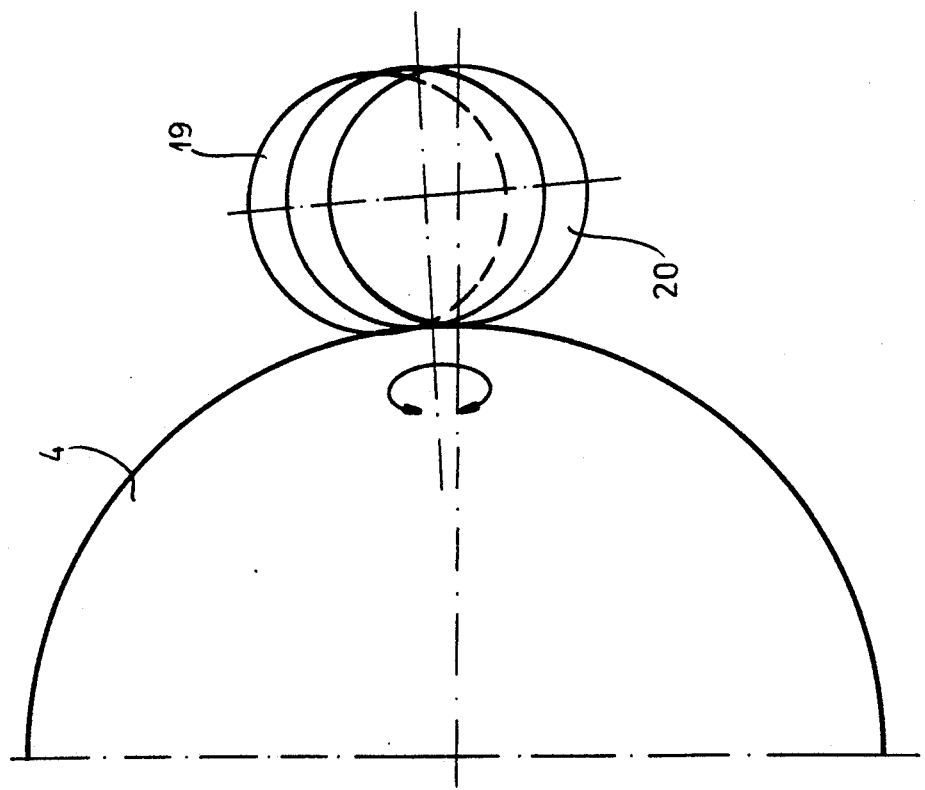
FIG. 4 is a diagrammatic elevational view showing the rollers or wheels engaging the drum.

As can be seen from FIGS. 3 and 4, rollers 19 and 20 engage the cylinder 4 in the region of the laser beam impingement upon the surface of the hollow cylinder and have axes 21 and 22 which are inclined to the cylinder axis 102, these rollers having a curved outer peripheral contour. The rollers are provided in the engraving region 17 shown diagrammatically, i.e. the location at which the laser beam 13 impinges upon the cylinder The rollers have only been illustrated by the diagrammatic ellipses 19' and 20' in FIG. 1 and will be understood to be mounted upon the carriage 6 for movement with the laser beam.

Because of the inclined axes, as these rollers 19 and 20 roll on the surface of the cylinder 4, an axial sliding component is provided between the surface of each roller and the outer surface of the cylinder to effect an intensive cleaning of the cylinder from adherent cinders and particles formed by the burn off of the cover material. One of the rollers serves primarily to remove the cinders while the other removes particles which might have been detrimental to the laser beam.

The rollers 19 and 20 are not fixedly positioned with respect to the laser head 15, etc. but can additionally oscillate or swing in the direction of the cylinder axis to reinforce the cleaning action.

In addition, they can be swingable about an axis intersecting not only the cylinder axis but also the respective roller axes at right angles to permit the contract curve between the pattern cylinder and the rollers to be accommodated to various sizes of template of pattern radii.

The rollers 19 and 20 can have surface layers of plastic or textile material to promote the cleaning action.

Furthermore, the rollers 19 and 20 provide a bracing of the region 17 so that the focus of the laser beam 13 can always lie precisely on the surface of the cylinder 4.

Furthermore, the system has the significant advantage that, upon a change of the pattern cylinder 4, the cylinder need not be drawn over a mandrel or the like and for the change the rollers 19 and 20 need only be swung out of the way and need not be replaced.

Since only the swinging of the rollers 19 and 20 out of the way and the horizontal positioning of one of the support cones is necessary for replacement of a pattern drum, the described system can be easily automated.

For further reinforcement of the cleaning action, independently of the pressing of the rolls against the cylinders and vice versa, a vacuum can be generated in the region of the engraving location 17. This suction applied to the region between the rollers 19 and 20 and around them ensures that the foil of the pattern drum will remain in contact with the rollers and thereby counters any tendency of the foil to move away from the rollers. In addition, the vacuum or suction removes particles which may have been only loosened by the relative movement of the rollers 19 and 20 against the cylinder 4, whereby such loosened particles will be entrained in the air stream and carried away.

The particles and vapors produced by the laser beam impingement on the cover material can also be carried away in this flow.

Figure 5:
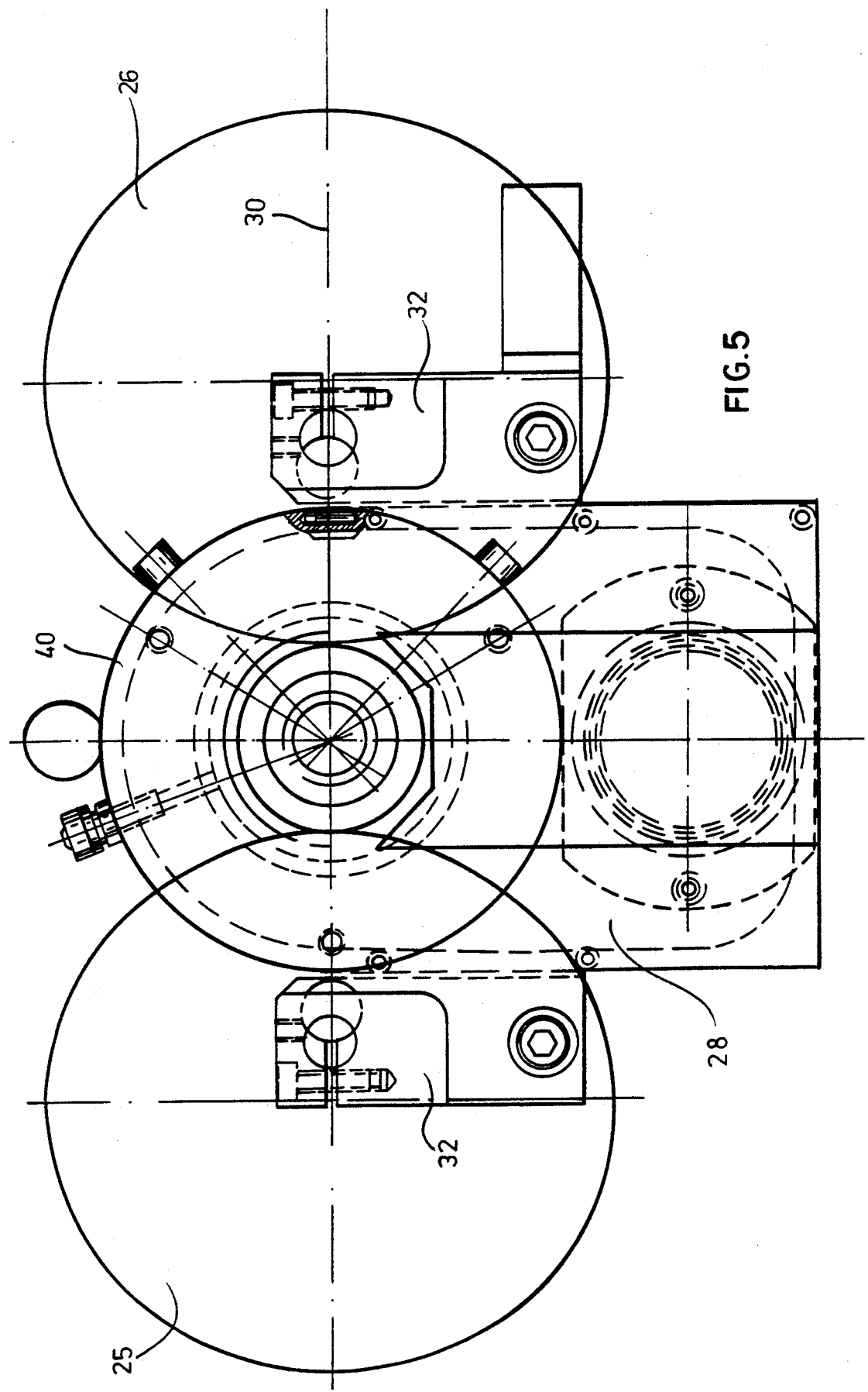
FIG. 5 is an end view of the cross slide on the longitudinal carriage illustrating another embodiment of the invention.
Figure 6:
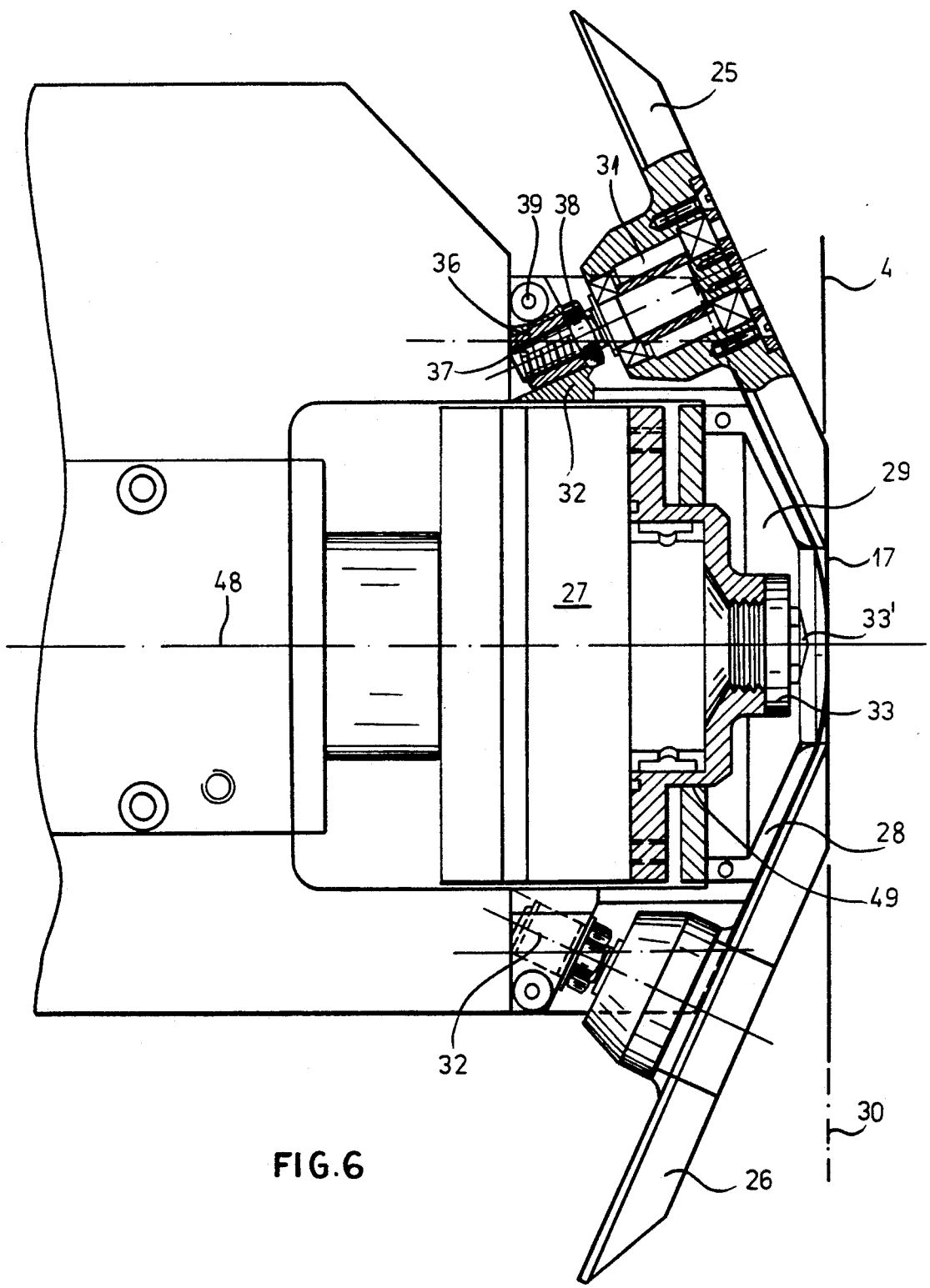
FIG. 6 is a plan view partly broken away and in cross section illustrating this embodiment.
Figure 7:
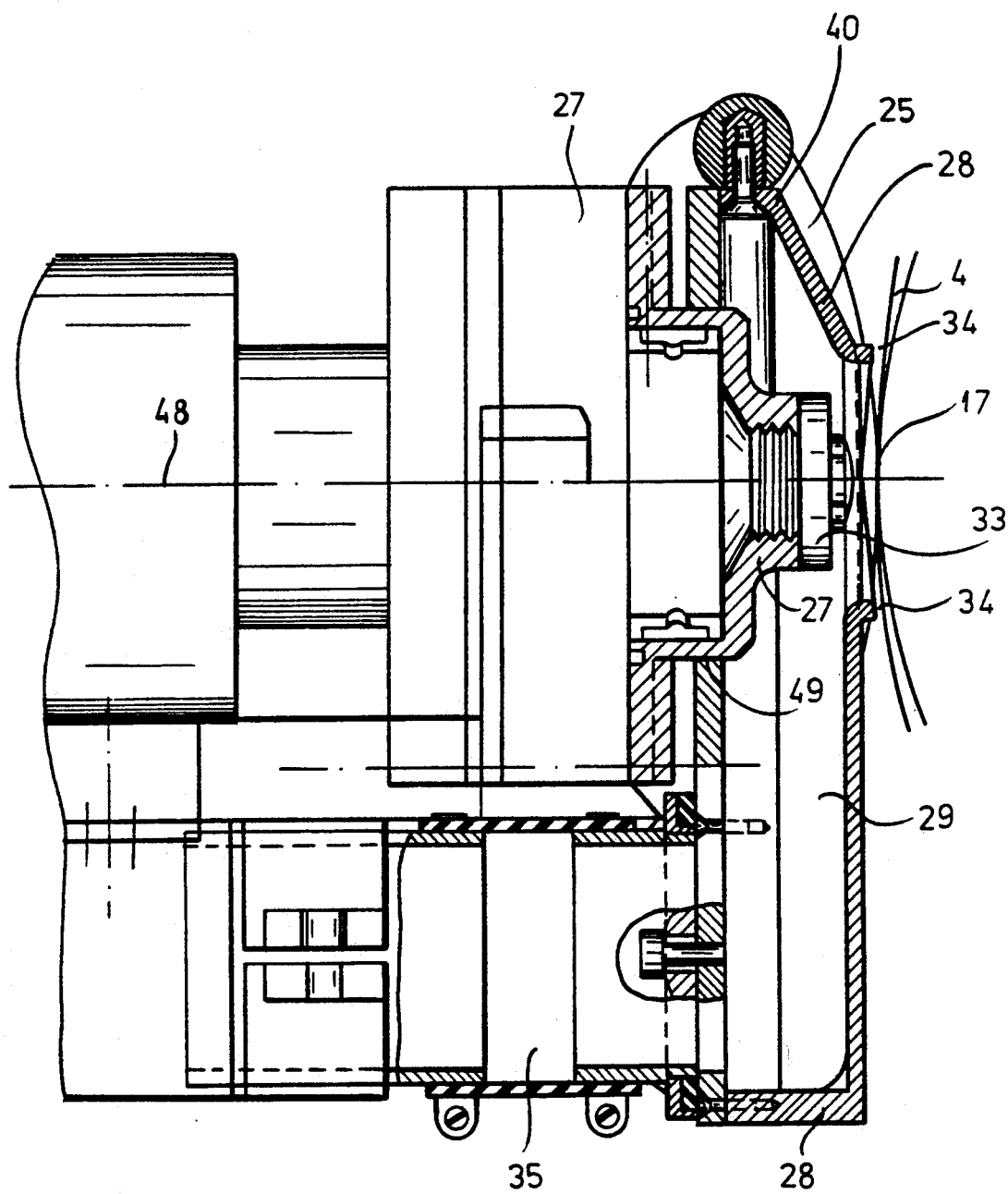
FIG. 7 is an elevational view, partly broken away and in cross section showing this embodiment.

In FIGS. 5 to 7 I have shown another embodiment of the invention. Here the two rollers are two bevelled rollers or conical rollers 25 and 26 which bear against the foil 4 such that their generatrices correspond to the generatrix 30 of the hollow cylinder 4.

The frustoconical support rollers 25 and 26 are journaled by bearings 31 on a support housing 32 carried by the cross slide.

The laser beam 13 is here focused within a laser cutting head 27 by an appropriate objective lens system and is trained through a small bore 33' in the mouthpiece 33 of this head onto the hollow cylinder 4.

Ahead of the laser cutting head 27 is a vacuum housing 28 so constructed that it encloses the mouthpiece 33 and defines a vacuum chamber 29 therearound. The vacuum chamber 29 communicates via a gap 34 with the region around the engraving region 17. A vacuum pipe 35 draws air from the vacuum chamber 29 and air flows into this vacuum chamber through the gap 34. This flow creates a pressure differential between the atmosphere in the working space and the vacuum chamber and ensures that the template will be forced against the frustoconical support rollers 25 and 26. Thus even if the cylinder is composed of a comparatively thin foil, it will not tend to move away from the frustoconical support rollers 25 and 26.

The frustoconical support rollers 25 and 26 are mounted on the housing 32 by means of clamping sleeves 36 which can be tightened by clamping screws 39. The pins 37 extending from the bearings of the frustoconical support rollers 25 and 26 are threaded and can be positioned by a counternut 38 after they are inserted in the smooth surfaced bores of the respective split clamping sleeve 36 which can retain the pins 37 when the screws 39 are tightened. This allows the support rollers 25 and 26 to be readily dismounted upon loosening of the screws 39 and to be reinserted without loss of the adjustment of the positions of the rollers 25 and 26 and without requiring them to be readjusted in position.

Figure 8:
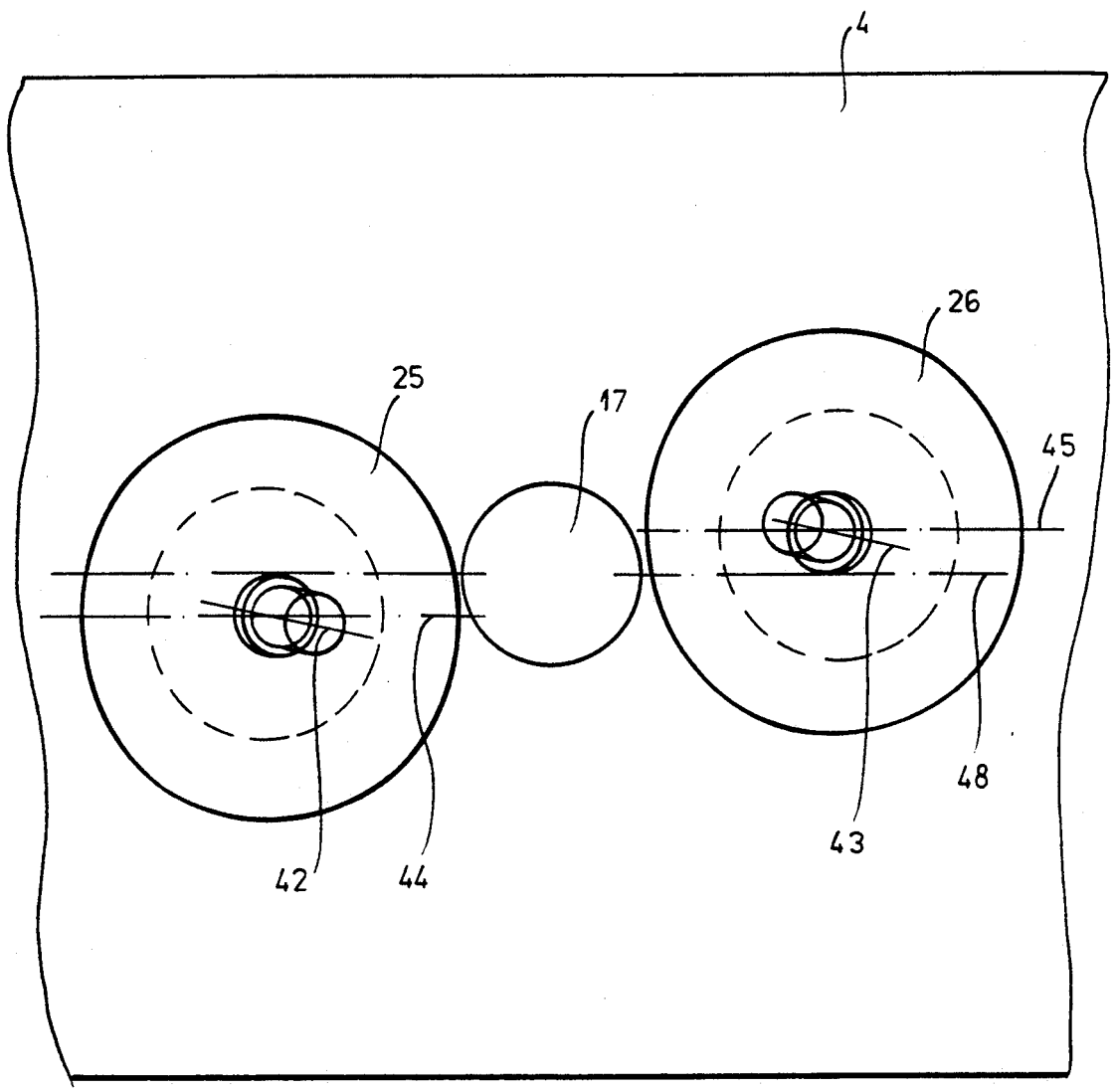
FIG. 8 is an end view of yet another embodiment.

The vacuum housing 28 is provided with a half round cover 40 (FIG. 7) which affords rapid and convenient access to the mouthpiece 33. The vacuum housing is shiftable relative to the laser cutting head 33 along the laser beam axis 48 so that the focus of the laser beam can be set independently of the gap 34. A very narrowly dimensioned gap 49 seals the rear wall of the vacuum housing 28 against the laser cutting head 27. As can be seen from FIG. 8, the last mentioned embodiment can be varied by offsetting the axes 42 and 43 so that they lie in two different planes from the plane of the axis 48 of the cylinder 4. In this case, the roller 25 engages the cylinder 4 approximately along its generatrix 44 while the roller 46 engages the cylinder along its generatrix 45. The result is a contourtrue bracing of the foil cylinder.

Figure 9:
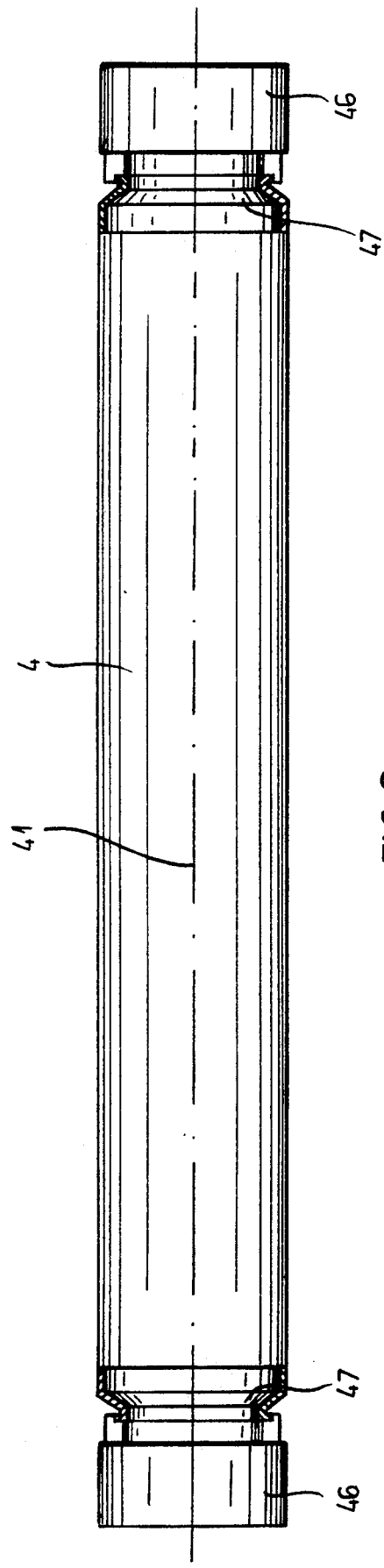
FIG. 9 is a diagrammatic elevational view, partly broken away of this other embodiment.

In FIG. 9 I have shown a modified arrangement of the ends of the hollow cylinder 4 requiring different support devices for these ends. Instead of the supporting cones 7 and 8 which are utilized in FIG. 2 to support and center the ends of the hollow cylinder, here, for the same purpose, two to three-jaw chucks 46 are provided as are will known from the lathe arts.

These three jaw chucks are able to engage rigid end pieces 47 of the cylinder with sufficient accuracy.

In this embodiment as well one of the sets of rollers 19, 20 or 25, 26 are used to brace the pattern cylinder wall in the region of the laser machining.

Figure 10:
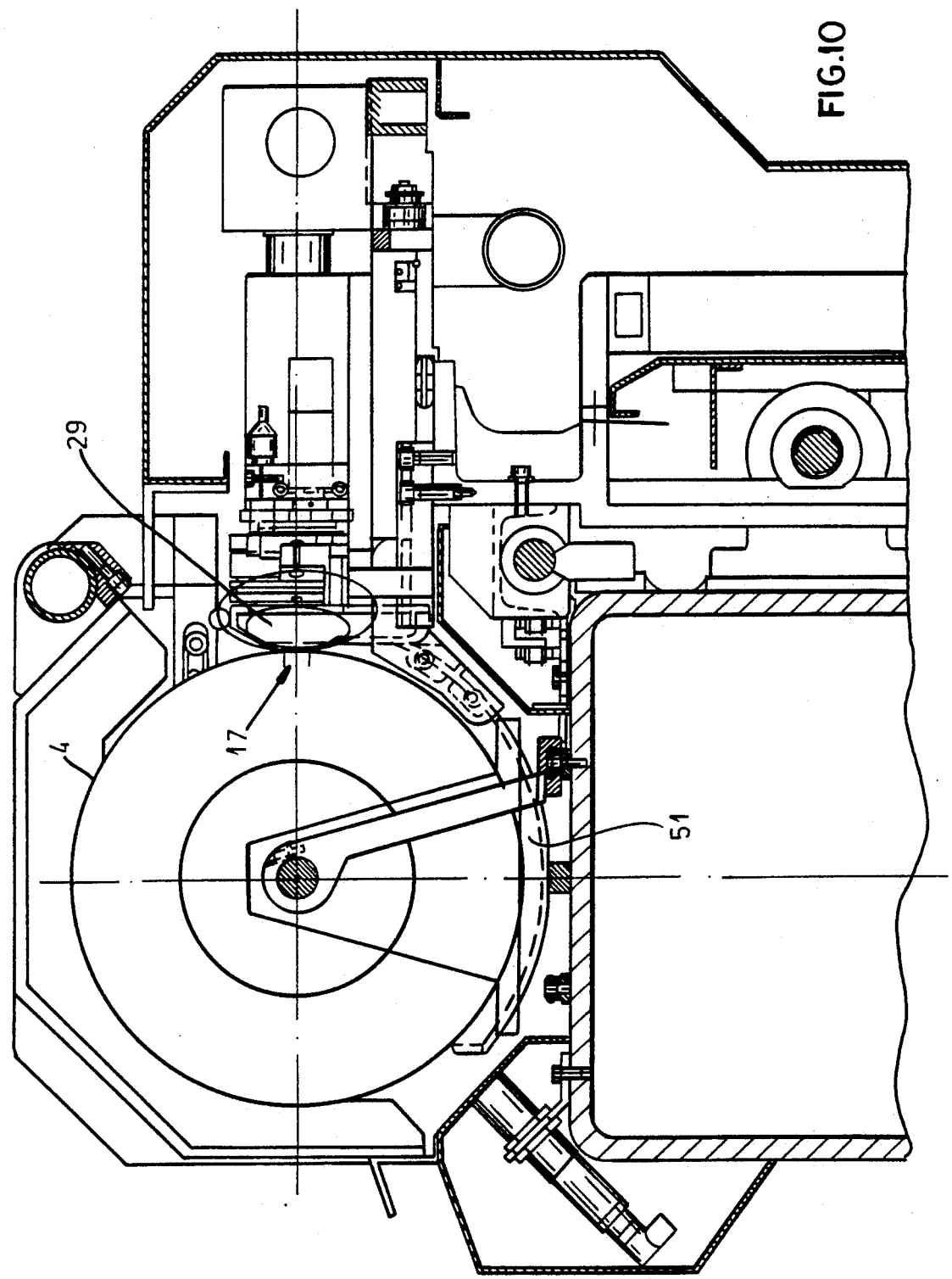
FIG. 10 is a cross sectional view through this embodiment with the cross section plane perpendicular to the axis of the hollow drum or cylinder.

In the embodiment of FIG. 10, it can be seen that an annular suction passage 51 can communicate with the vacuum chamber 29, this suction passage extending below the lower half of the cylinder 4.

Over the region of this suction passage, therefore, a subatmospheric pressure is generated in relation to the air pressure in the work room and the thin wall of the hollow cylinder is held in shape because of the annular gap provided by the suction air passage also during its circumferential travel. An uncontrolled shifting of the foil wall of the cylinder which is normally superimposed upon the desired rotation can here be avoided and thus the small deviations from the cylindrical shape which can be detrimental to precision removal of material by the laser beam can be avoided.

I claim:

1. An apparatus for machining a hollow cylinder to produce a pattern drum, comprising:
    a support defining an axis for a hollow cylinder to be machined and receiving said hollow cylinder for rotating said hollow cylinder about said axis;
    a guide extending parallel to said axis;
    a carriage displaceable along said guide relative to said hollow cylinder;
    a drive operatively connected to said carriage for displacing same along said guide;
    a machining laser generating a beam adapted to remove material from said hollow cylinder;
    laser optics on said carriage training said beam against said hollow cylinder; and
    a plurality of roller elements bearing frictionally against an external surface of said hollow cylinder and rollingly engaging same in an axial and in a circumferential direction.

2. The apparatus defined in claim 1 wherein said roller elements are mounted upon said carriage to engage said external surface of said hollow cylinder in a region thereof proximal to a machining location at which said beam impinges upon said external surface.

3. The apparatus defined in claim 2, further comprising suction means for applying suction to said external surface in a region of said location between two of said roller elements.

4. The apparatus defined in claim 2 wherein said roller elements are rollers having axes inclined to said hollow cylinder.

5. The apparatus defined in claim 4 wherein said rollers have concave peripheries engaging said external surface.

6. The apparatus defined in claim 2 wherein said roller elements are rollers having peripheries with generatrices coinciding with generatrices of said external surface of said hollow cylinder.

7. The apparatus defined in claim 2 wherein said roller elements are disposed forwardly and rearwardly of said location with respect to a direction of displacement of said carriage along said guide.

8. The apparatus defined in claim 2 wherein said roller elements are mounted for oscillating movement in a direction of said axis of said hollow cylinder.

9. The apparatus defined in claim 2 wherein said roller elements are swingably mounted on said carriage.

10. The apparatus defined in claim 3 wherein said suction means includes a vacuum housing shiftable with respect to said optics in a direction of an axis of said laser beam and independently thereof.

11. The apparatus defined in claim 3 wherein said suction means includes a vacuum chamber and a suction air duct connected therewith by an effective inflow technique.

12. The apparatus defined in claim 11 wherein said suction air duct engages around a lower half of said hollow cylinder.

13. The apparatus defined in claim 2 wherein said roller elements are driven by a respective motor.

14. The apparatus defined in claim 2 wherein said roller elements have slightly concave peripheries conforming in cross section to a segment of an ellipse.

15. The apparatus defined in claim 2 wherein said roller elements have slightly concave peripheries conforming in cross section to a segment of a hyperbola.

* * * * *